(12) United States Patent
Yoshimura et al.

(10) Patent No.: US 6,421,304 B1
(45) Date of Patent: Jul. 16, 2002

(54) MAGNETO-OPTICAL REPRODUCING APPARATUS USING MAGNETIC WALL DISPLACEMENT DETECTOR

(75) Inventors: Shunji Yoshimura, Tokyo; Atsushi Fukumoto, Kanagawa; Shinichi Kai, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/551,428

(22) Filed: Apr. 18, 2000

(30) Foreign Application Priority Data

Apr. 20, 1999 (JP) .............................. 11-112840

(51) Int. Cl.[7] .............................................. G11B 11/00
(52) U.S. Cl. .................................................. 369/13.06
(58) Field of Search .................... 369/13, 14; 360/59, 360/110; 428/64.3, 694 ML, 694 MM

(56) References Cited

U.S. PATENT DOCUMENTS

| | | | |
|---|---|---|---|
| 5,953,289 A | * | 9/1999 | Miyaoka ...................... 369/13 |
| 5,956,297 A | | 9/1999 | Yamamoto |
| 6,041,024 A | * | 3/2000 | Ishii ............................. 369/13 |
| 6,069,852 A | * | 5/2000 | Miyaoka et al. .............. 369/13 |

OTHER PUBLICATIONS

Patent Abstracts of Japan, JP 10–092045, Apr. 10, 1998.
Patent Abstracts of Japan, JP 10–092046, Apr. 10, 1998.

* cited by examiner

*Primary Examiner*—Tan Dinh
(74) *Attorney, Agent, or Firm*—Oblon, Spivak, McClelland, Maier & Neustadt, P.C.

(57) ABSTRACT

A magneto-optical reproducing apparatus for reproducing from a magnetic film medium having at least a displacement layer, a switching layer, and a memory layer. A magnetic wall displacement is generated in the displacement layer in any region where the temperature exceeds the Curie temperature of the switching layer to effectively enlarge any recorded magnetic domain. The reproduced signal from the magnetic film medium is equalized with regard to waveform in an equalizer circuit and then fed to a magnetic wall displacement detection circuit that produces a magnetic wall displacement signal by using a differential signal or a secondary differential signal of the reproduced signal so as to provide a low bit error rate despite any sudden DC level variation in the reproduced signal.

4 Claims, 12 Drawing Sheets

F I G.12
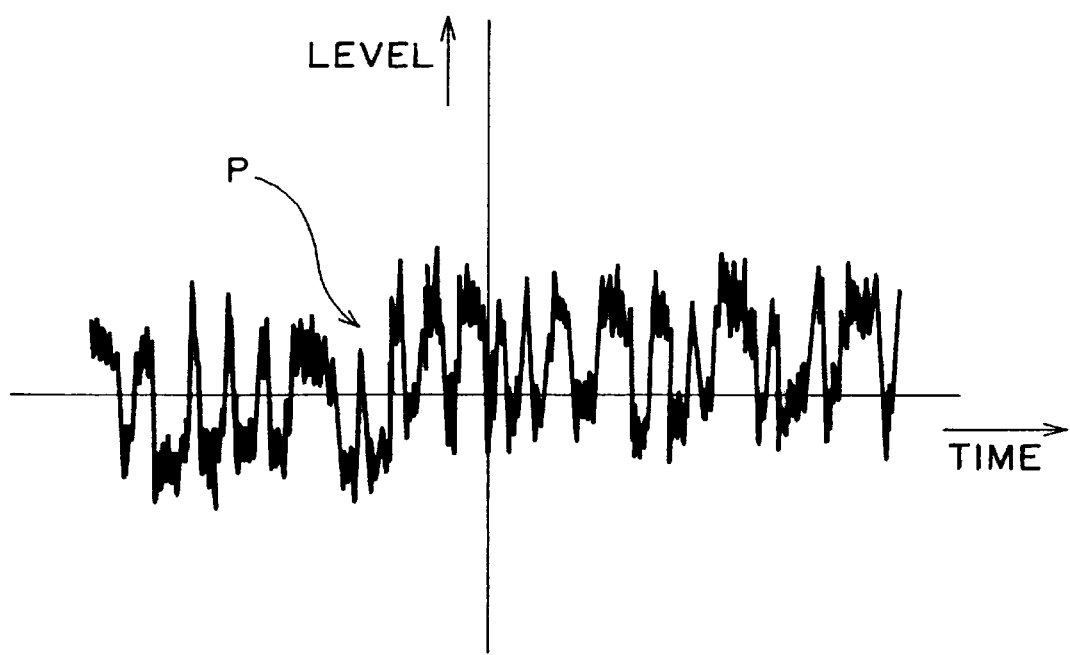

MAGNETO-OPTICAL REPRODUCING APPARATUS USING MAGNETIC WALL DISPLACEMENT DETECTOR

BACKGROUND OF THE INVENTION

The present invention relates to a data reproducing apparatus and method handling a magneto-optical recording medium which has a magnetic three-layer film consisting at least of a displacement layer, a switching layer and a memory layer so formed that, in any region where the temperature of the magnetic film exceeds the Curie temperature of the switching layer, displacement of a magnetic wall is generated in the displacement layer to dimensionally enlarge the effectively recorded magnetic domain. More particularly, the present invention relates to a data reproducing apparatus and method capable of detecting generation of a magnetic wall displacement from a differential signal of a reproduced signal or a difference signal thereof in the time base direction and detecting data by the use of such detection output, hence performing proper reproduction of the data at a sufficiently low bit error rate even if any sudden DC level variation peculiar to a DWDD mode is caused in the reproduced signal.

There are known magneto-optical recording media employed as rewritable high-density recording media. And among such magneto-optical recording media, one type is attracting notice recently. It has a magnetic three-layer film consisting at least of a displacement layer, a switching layer and a memory layer, wherein a magnetic wall displacement of the displacement layer is generated in any region where the magnetic film temperature is rendered higher than the Curie temperature of the switching layer, so that the size of an effectively recorded magnetic domain is enlarged. A reproduction method handling such a magneto-optical recording medium is termed a DWDD (Domain Wall Displacement Detection) mode. According to this DWDD mode, a very large signal can be reproduced also from a tiny recording domain of a period below the optical limit resolution of a light beam, whereby a high density is attainable without the necessity of changing the wavelength of light, the numerical aperture NA of an objective lens and so forth.

Now a further detailed explanation will be given on such DWDD mode.

As shown in FIG. 9A, a magneto-optical recording medium 10 has a three-layer film of switched connection consisting of a displacement layer 11, a switching layer 12 and a memory layer 13 formed in this order. The memory layer 13 is composed of a perpendicular magnetizing film indicating a great magnetic wall reluctance. The displacement layer 11 is composed of another perpendicular magnetizing film indicating a small magnetic wall reluctance and having a high magnetic wall displaceability. The switching layer 12 is composed of a magnetic layer whose Curie temperature Ts is lower than those of the displacement layer 11 and the memory layer 13. Each arrow 14 in the individual layers denotes the direction of atomic spin. A magnetic wall 15 is formed in the boundary between regions where the atomic spin directions are mutually reverse.

If the surface of a recording film is locally heated by the use of a reproducing light beam (laser beam) 16, there is formed a distribution of temperature T as shown in FIG. 9B, and accordingly a distribution of magnetic wall energy density σ is formed as shown in FIG. 9C. Since the magnetic wall energy density σ generally becomes lower in accordance with a temperature rise, the distribution is such that the magnetic wall energy density σ becomes minimum at the position of the highest temperature. As a result, a magnetic wall driving force F(x) for displacement toward the high temperature side, where the magnetic wall energy density σ is low, is generated as shown in FIG. 9D. FIG. 9E shows the positional relationship between a spot 16P of the light beam 16 and a region 17 whose temperature is higher than the Curie temperature Ts of the switching layer 12.

In any area of the medium 10 where the temperature is lower than the Curie temperature Ts of the switching layer 12, the magnetic layers are mutually in switched connection, so that even when the magnetic wall driving force F(x) due to the above-described temperature gradient is applied, it is checked by the great magnetic wall reluctance of the memory layer 13 to eventually cause no displacement of the magnetic wall 15. However, in any area of the medium 10 where the temperature is higher than the Curie temperature Ts, the switched connection between the displacement layer 11 and the memory layer 13 is cut off, so that the magnetic wall 15 of the displacement layer 11 having a small magnetic wall reluctance is rendered displaceable by the magnetic wall driving force F(x) due to the temperature gradient. Consequently, upon entrance of the magnetic wall 15 into the connection cut-off region beyond the position of the Curie temperature Ts with scanning of the medium 10 by the light beam 16, then the displacement layer 12 begins to be displaced toward the higher temperature side of the magnetic wall 15.

Whenever any of the magnetic walls 15 formed at intervals corresponding to the recorded signal on the medium 10 passes the position of the Curie temperature Ts with scanning of the medium by the light beam 16, there occurs a displacement of the magnetic wall 15 of the displacement layer 11. Since the effectively recorded magnetic domain is enlarged dimensionally by such displacement, it becomes possible to reproduce a very large signal as well even from tiny recorded domains of a period below the optical limit resolution of the light beam 16.

As the light beam 16 scans the medium 10 at a fixed speed, the above-described magnetic wall displacement is generated at a temporal interval corresponding to the spatial interval of the recorded magnetic walls 15. The generation of such magnetic wall displacement can be detected as a change in the polarization plane of the reflected light of the light beam (laser beam) 16.

As shown by broken lines in FIG. 9A, a magnetic wall displacement is generated from the rear of the region 17 as well, so that the signal due to such magnetic wall displacement from the rear is superimposed as a ghost signal on the reproduced signal due to the magnetic wall displacement from the front. Although an explanation on this ghost signal is omitted here, the problem arising therefrom can be solved by properly contriving the application of a reproducing magnetic field or the recording film.

The DWDD type magneto-optical disk apparatus mentioned above is substantially similar in structure to any general magneto-optical disk recording/reproducing apparatus. FIG. 10 shows a partial structure of a conventional reproducing section in such an apparatus. A reproduced signal $S_{MO}$ obtained from an optical head (not shown) is supplied to an equalizer circuit 21 where the frequency characteristic thereof is compensated. A reproduced signal $S_{MO'}$ obtained after such frequency characteristic compensation is supplied to a binary coding circuit 22, which then converts the input signal into a binary signal S2.

The binary signal S2 outputted from the binary coding circuit 22 is supplied to a data detection circuit 23 and a PLL (phase-locked loop) circuit 24. In the PLL circuit 24, a clock signal CLK synchronized with the leading and trailing edges of the binary signal S2 is produced, and then the clock signal CLK is supplied to the data detection circuit 23. Subsequently in the data detection circuit 23, data are detected from the binary signal S2 by the use of the clock signal CLK and then are outputted as reproduced data PD.

On a DWDD type magneto-optical disk, signals are recorded in such a manner that data bit strings are first converted into, e.g., RLL modulated bits and then are processed in NRZI (Non-Return to Zero Inverted) mode where a portion with data inversion is expressed as 1 while a portion without data inversion is expressed as 0. In this case, the data detection circuit 23 converts, e.g., NRZI data into NRZ data, whereby RLL modulated data are obtained as reproduced data PD.

The binary coding circuit 22 consists of a comparator 22a having a fixed threshold value as shown in FIG. 11A, or a comparator 22b of FIG. 11B for integrating the binary signal S2 by an integrator 23 and feeding back the same to a threshold value, or a comparator 22c of FIG. 11C equipped with, on its input side, a DC controller 24 for calculating the envelope center value by the use of a peak hold circuit or a bottom hold circuit and then feeding back the center value.

In the above-described DWDD type, however, there still exist many problems to be solved. For example, some variation is caused suddenly in the DC level of the reproduced signal $S_{MO}$. Such a phenomenon is supposed to be derived from that the direction of magnetization is indefinite and may be inverted with a certain probability in any region other than those contributing to detection of the signal by magnetic wall displacement in the light beam spot.

FIG. 12 graphically shows an actual reproduced waveform representing the above phenomenon. On a DWDD type magneto-optical disk, signal is recorded in the NRZI mode as described, and it is seen in this diagram that the DC level of the reproduced signal is suddenly varied upward in the portion indicated by an arrow P. Upon occurrence of such a phenomenon, it is impossible to obtain a proper binary signal in the binary coding circuit of FIG. 11A which converts the input signal into binary one with a fixed threshold value. Even in using the binary coding circuit of FIGS. 11B or 11C, the relevant DC level variations are extremely faster than the response speed of the coding circuit and may become continuous bit errors during a period prior to the follow-up of the coding circuit.

SUMMARY OF THE INVENTION

It is therefore an object of the present invention to provide a data reproducing apparatus and method capable of reproducing data at a sufficiently low bit error rate despite any sudden DC level variation caused in the reproduced signal.

According to one aspect of the present invention, there is provided a DWDD type data reproducing apparatus which includes a signal reproducing means for irradiating a light beam from the side of a displacement layer onto a magneto-optical recording medium while moving the light beam relatively to the medium, and displacing a magnetic wall which has a gradient on the magnetic recording medium in the direction of motion of the light beam spot and is formed in the displacement layer with a temperature distribution having a temperature region higher than the Curie temperature of at least the switching layer, thereby obtaining a reproduced signal which corresponds to the change on a polarization plane of the reflected light of the light beam; a magnetic wall displacement detection means for detecting generation of the magnetic wall displacement by the use of a differential signal of the reproduced signal obtained from the signal reproducing means, or by the use of a difference signal thereof in the time base direction; and a data detection means for detecting data by the use of the detection signal obtained from the magnetic wall displacement detection means.

According to another aspect of the present invention, there is provided a DWDD type data reproducing method which includes a first step of irradiating a light beam from the side of a displacement layer onto a magneto-optical recording medium while moving the light beam relatively to the medium, and displacing a magnetic wall which has a gradient on the magnetic recording medium in the direction of motion of the light beam spot and is formed in the displacement layer with a temperature distribution having a temperature region higher than the Curie temperature of at least the switching layer, thereby obtaining a reproduced signal which corresponds to the change on a polarization plane of the reflected light of the light beam; a second step of detecting generation of the magnetic wall displacement by the use of a differential signal of the reproduced signal obtained at the first step, or by the use of a difference signal thereof in the time base direction; and a third step of detecting data by the use of a detection signal which represents generation of the magnetic wall displacement detected at the second step.

In the present invention, every time any of the magnetic walls formed in the magneto-optical recording medium at intervals corresponding to the recorded signal passes the Curie temperature position in accordance with scanning of the medium by the light beam, the magnetic wall of the displacement layer is displaced, so that the level of the reproduced signal is changed sharply and suddenly in conformity with such magnetic wall displacement. Therefore, upon generation of the magnetic wall displacement, the level of the differential signal of the reproduced signal or that of the difference signal in the time base direction is raised. Consequently, generation of the magnetic wall displacement can be detected by the use of such differential signal or difference signal.

As the light beam scans the medium at a fixed speed, the aforementioned magnetic wall displacements are generated at a temporal interval corresponding to the spatial interval of the recorded magnetic walls. Therefore, it becomes possible to perform detection of data by the use of a detection signal representing the generation of such magnetic wall displacement. In this case, generation of the magnetic wall displacement is detected by using the differential signal of the reproduced signal or the difference signal thereof in the time base direction, so that detection of the displacement can be executed without being harmfully affected by any variation caused in the DC level of the reproduced signal. Thus, reproduction of the data can be performed at a sufficiently low bit error rate despite any sudden DC level variation of the reproduced signal peculiar to the DWDD type.

The above and other features and advantages of the present invention will become apparent from the following description which will be given with reference to the illustrative accompanying drawings.

BRIEF DESCRIPTION OF THE DRAWINGS

FIG. 12 graphically shows an exemplary reproduced waveform with occurrence of DC level variations peculiar to the DWDD type.

DESCRIPTION OF THE PREFERRED EMBODIMENTS

Figure 1:
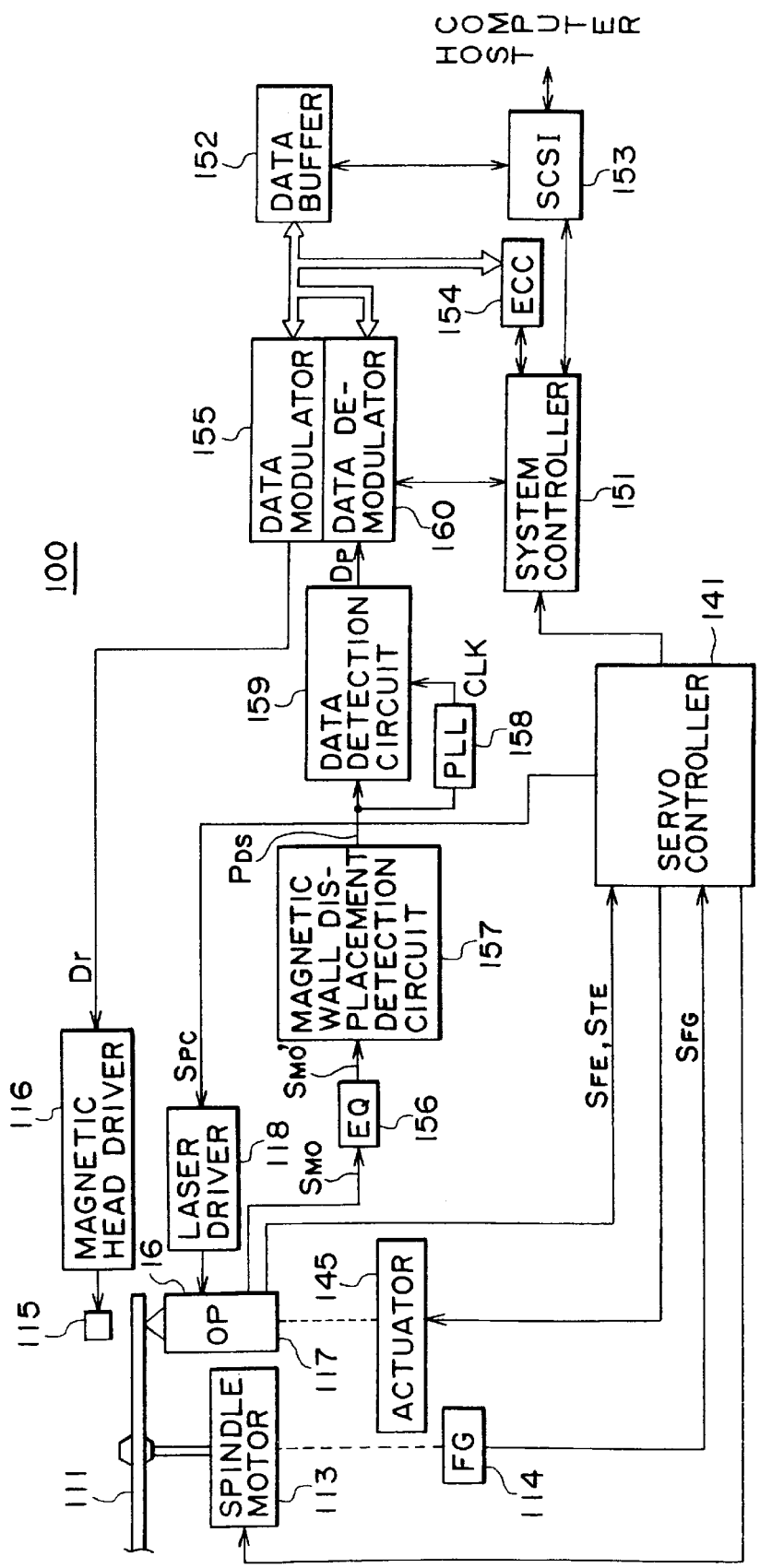
FIG. 1 is a block diagram showing an exemplary structure of a magneto-optical disk apparatus represented as a preferred embodiment of the invention.

Hereinafter some preferred embodiments of the present invention will be described in detail with reference to the accompanying drawings. FIG. 1 shows a DWDD type magneto-optical disk apparatus 100 as one embodiment.

Figure 9A:
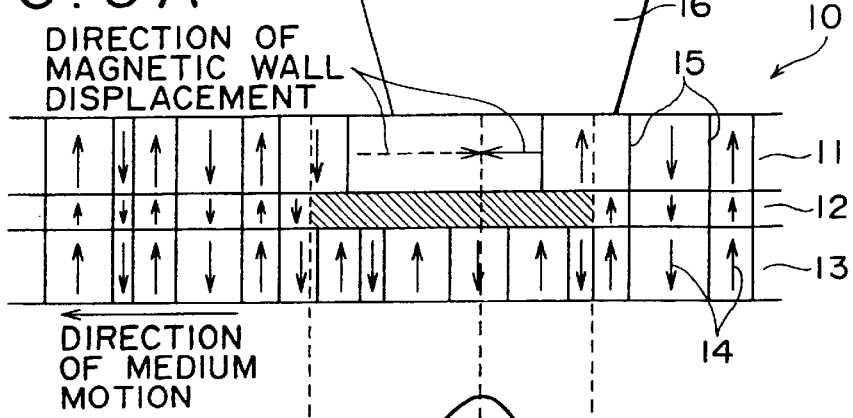
FIGS. 9A to 9E are explanatory diagrams of a DWDD mode.
Figure 9B:
Figure 9C:
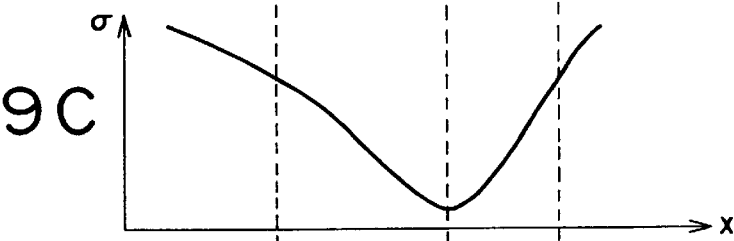
Figure 9D:
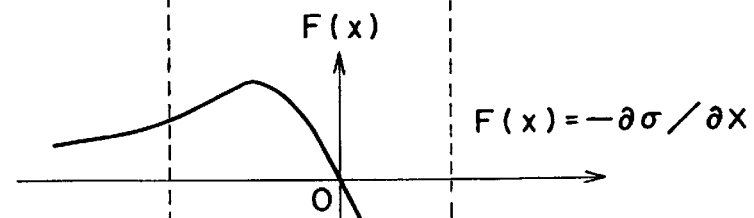
Figure 9E:
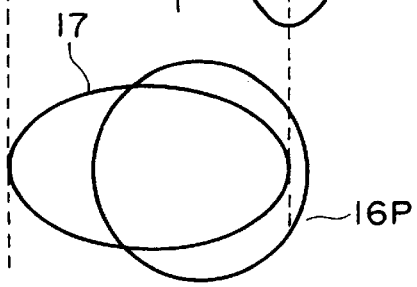
Figure 10:
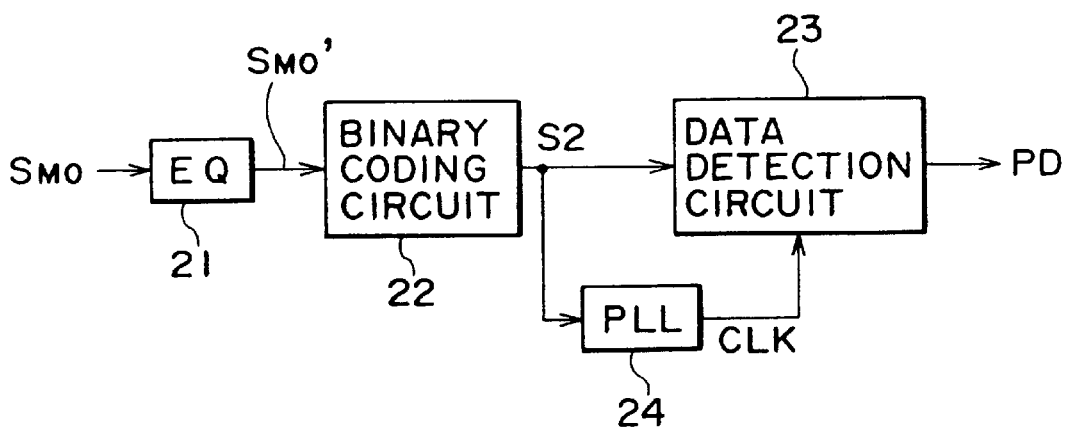
FIG. 10 is a block diagram partially showing a reproducing section of a conventional magneto-optical disk apparatus.
Figure 11A:
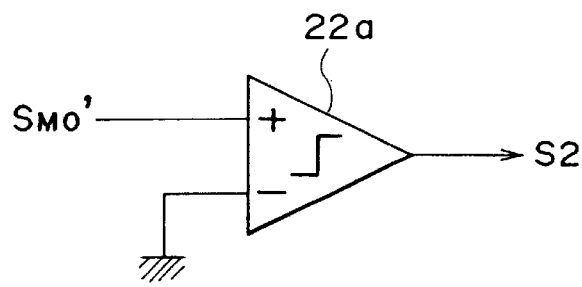
FIGS. 11A to 11C show some structural examples of a binary coding circuit.
Figure 11B:
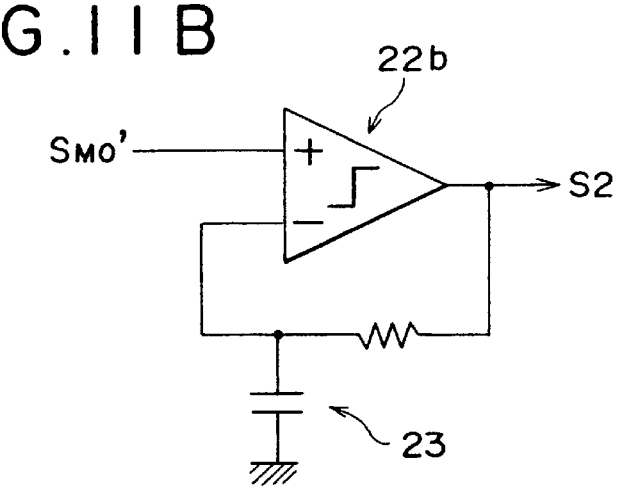
Figure 11C:
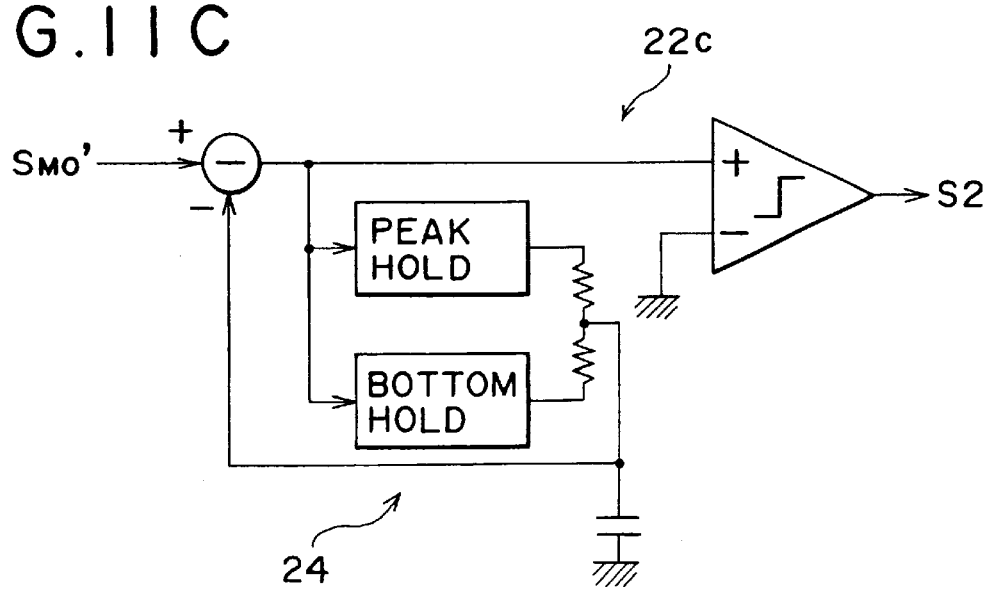

A magneto-optical disk 111 handled in this disk apparatus 100 is so composed that a magneto-optical recording medium 10 described already in connection with FIG. 9A is deposited on a substrate of glass or plastic material, and a protective film is formed thereon.

The disk apparatus 100 has a spindle motor 113 for driving the magneto-optical disk 111 to rotate the same. The magneto-optical disk 111 is driven to be rotated at a constant angular velocity in both recording and reproducing modes. A frequency generator 114 is attached to the rotary shaft of the spindle motor 113 for detecting the rotation speed thereof.

The disk apparatus 100 further has a magnetic head 115 for generating an external magnetic field; a magnetic head driver 116 for controlling generation of the magnetic field from the magnetic head 115; an optical head 117 consisting of a semiconductor laser, an objective lens, an optical detector and so forth; and a laser driver 118 for controlling emission of the light from the semiconductor laser in the optical head 117. The magnetic head 115 and the optical head 117 are disposed opposite to each other in a manner to interpose the magneto-optical disk 111 therebetween.

A laser power control signal $S_{PC}$ is supplied from an undermentioned servo controller 141 to the laser driver 118, and the power of the laser. beam emitted from the semiconductor laser of the optical head 117 serves as a recording power $P_W$ in a recording mode, or as a reproducing power $P_R$, which is lower than the recording power $P_W$, in a reproducing mode.

In a data write mode (recording mode), record data $D_r$ is supplied as NRZI data to the magnetic head driver 116 as will be described later, and a magnetic field corresponding to such record data $D_r$ is generated from the magnetic head 115, so that the record data $D_r$ is recorded on the magneto-optical disk 111 in cooperation with the light beam (laser beam) obtained from the optical head 117.

The disk apparatus 100 further has a servo controller 141 equipped with a CPU (central processing unit). To this servo controller 141, there are supplied a focus error signal $S_{FE}$ and a tracking error signal $S_{TE}$ produced in the optical head 117, and also a frequency signal $S_{FG}$ outputted from the aforementioned frequency generator 114.

The operation of the servo controller 141 is controlled by an undermentioned system controller 151. The servo controller 141 controls an actuator 145 which includes a tracking coil, a focus coil and a linear motor for radially moving the optical head 117, whereby tracking and focus servo control actions are executed, and the radial motion of the optical head 117 is also controlled. The servo controller 141 further controls the spindle motor 113, thereby controlling the magneto-optical disk 111 in a manner to rotate the same at a constant angular velocity in both the recording and reproducing modes.

The disk apparatus 100 further has a system controller 151 equipped with a CPU; a data buffer 152; and an SCSI (Small Computer System Interface) 153 for transferring data and commands therefrom or to a host computer. The system controller 151 serves to control the entire system.

The disk apparatus 100 further has an ECC (error correction code) circuit 154 for additionally attaching an error correction code to the write data supplied from the host computer via the SCSI 153 and serving to correct any error in the output data of an undermentioned data demodulator 159; and a data modulator 155 for converting bit strings of the write data where the error correction code has been attached by the ECC circuit 154, into RLL modulated bits and then converting the same into NRZI data to thereby obtain record data $D_r$.

The disk apparatus 100 further has an equalizer circuit 156 for compensating the frequency characteristic of the reproduced signal $S_{MO}$ obtained from the optical head 117; a magnetic wall displacement detection circuit 157 for detecting generation of a magnetic wall displacement from the reproduced signal $S_{MO}$, whose frequency characteristic has been compensated by the equalizer circuit 156; a PLL circuit 158 for obtaining a clock signal CLK synchronized with the leading edge of a detection signal (pulse signal) which signifies generation of the magnetic wall displacement outputted from the magnetic wall displacement detection circuit 157; a data detection circuit 159 for obtaining reproduced data (NRZ data) from the detection signal $P_{DS}$ by the use of the clock signal CLK; and a data demodulator 160 for obtaining read data through demodulation of the reproduced data $D_P$ (e.g., RLL modulated data).

Figure 2:
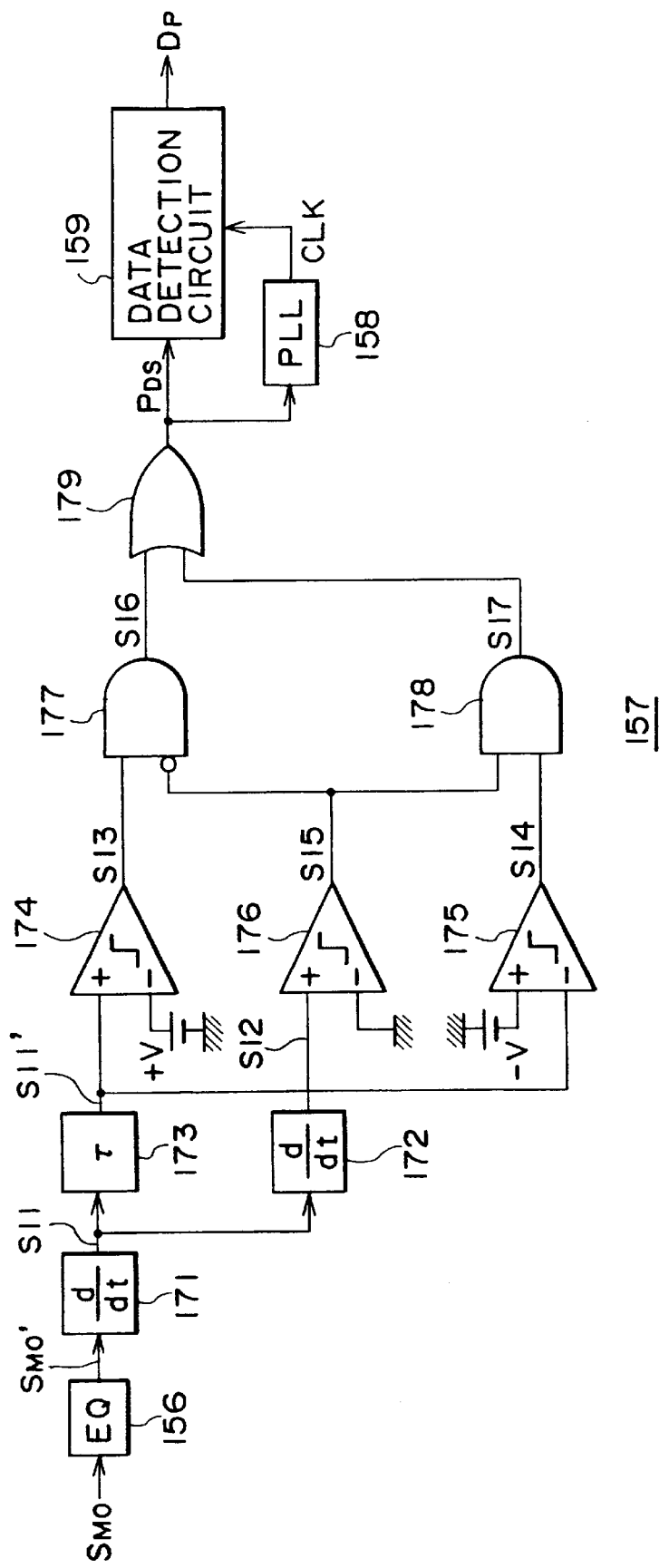
FIG. 2 is a block diagram showing a structural example of a magnetic wall displacement detection circuit.
Figure 3:
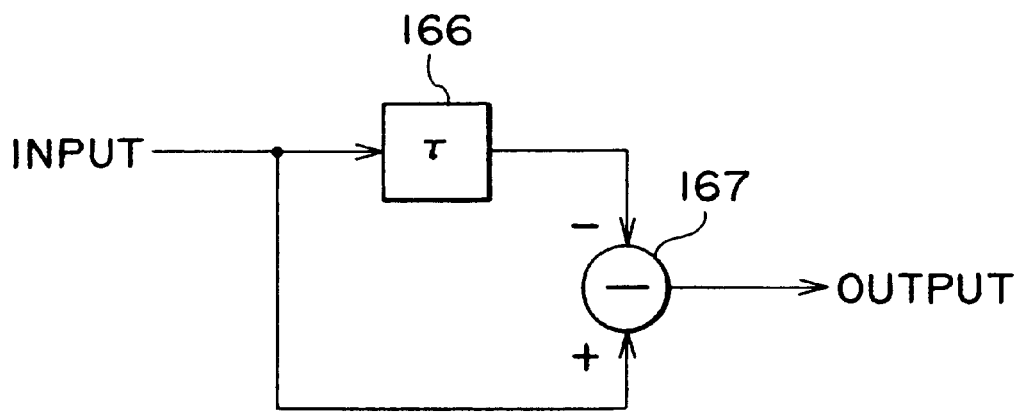
FIG. 3 is a block diagram showing a structural example of a difference circuit.

Now the structure of the magnetic wall displacement detection circuit 157 will be described below. FIG. 2 shows a structural example of the magnetic wall displacement detection circuit 157. This detection circuit 157 comprises a differentiator 171 for obtaining a differential signal S11 through differentiation of the frequency-compensated reproduced signal $S_{MO}$; a differentiator 172 for obtaining a secondary differential signal S12 through differentiation of the differential signal S11; and a delay circuit 173 for delaying the differential signal S11 to thereby obtain a differential signal S11' which is synchronized with the output timing of the secondary differential signal S12. Practically, either of the differentiators 171 and 172 need not be one that gives mathematically strict differentiation characteristic, and may be replaced with a difference circuit 165 of FIG. 3 consisting of a delay circuit 166 and a subtracter 167.

The detection circuit 157 comprises a comparator 174 for comparing the differential signal S11' with the positive threshold value +V and detecting the periphery of the leading edge of the reproduced signal $S_{MO}$; a comparator 175 for comparing the differential signal S11' with the negative threshold value −V and detecting the periphery of the trailing edge of the reproduced signal $S_{MO}$; and a comparator 176 for comparing the secondary differential signal S12 with a zero level and detecting the leading and trailing edges of the reproduced signal $S_{MO}$.

The detection circuit 157 further comprises an AND circuit 177 for taking a logical product of the output signal S13 of the comparator 174 and the output signal S15 of the comparator 176; an AND circuit 178 for taking a logical product of the output signal S14 of the comparator 175 and the output signal S15 of the comparator 176; and an OR circuit 179 for taking a logical sum of the output signals S16, S17 of the AND circuits 177, 178 to obtain a detection signal $P_{DS}$ which represents generation of the magnetic wall displacement.

Figure 4:
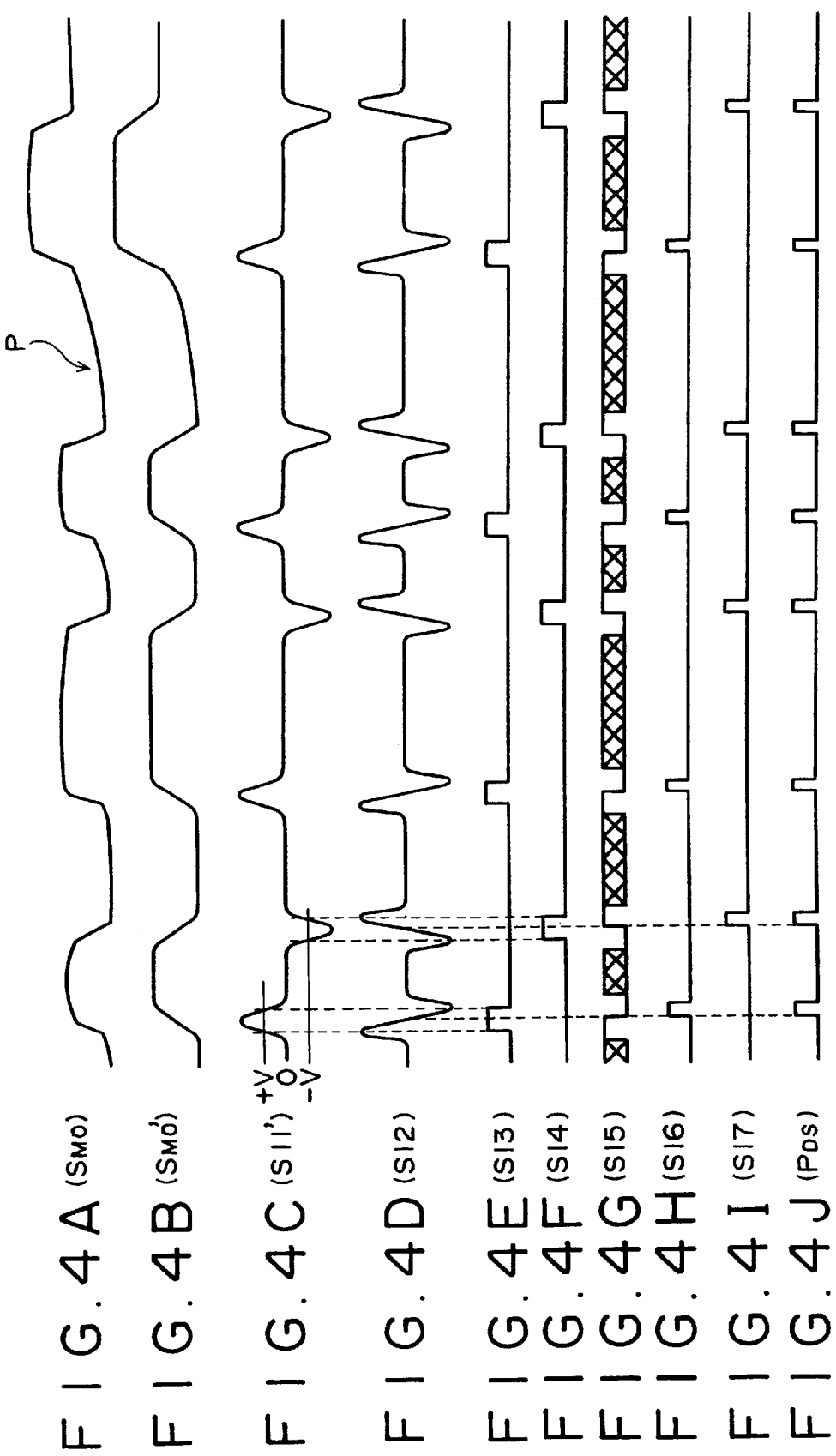
FIGS. 4A to 4J are timing charts of signals for explaining the operation of the magnetic wall displacement detection circuit.

Now the operation of the magnetic wall displacement detection circuit 157 shown in FIG. 2 will be described below with reference to timing charts of FIGS. 4A to 4J. FIG. 4A shows the reproduced signal $S_{MO}$ outputted from the optical head 115, wherein it is supposed that a sudden DC level variation peculiar to the DWDD type is generated in a portion indicated by an arrow P. The reproduced signal $S_{MO}$ is processed in the equalizer circuit 156 for compensation of its frequency characteristic, so that the waveform-equalized reproduced signal $S_{MO'}$ of FIG. 4B is obtained.

This reproduced signal $S_{MO'}$ is differentiated in the differentiator 171, so that a signal S11' shown in FIG. 4C is obtained from the delay circuit 173. The signal S11' is turned to a positive level correspondingly to the leading edge (portion with generation of one magnetic wall displacement) of the reproduced signal $S_{MO'}$, or is turned to a negative level correspondingly to the trailing edge (portion with generation of the other magnetic wall displacement) of the reproduced signal $S_{MO'}$.

The differential signal S11 outputted from the differentiator 171 is further differentiated in the differentiator 172, so that a secondary differential signal S12 of FIG. 4D is obtained. In this secondary differential signal S12, zero-crossing is induced in synchronism with the leading edge and the trailing edge of the reproduced signal $S_{MO}$. For briefing the explanation, it is assumed here that the process of differentiation in each of the differentiators 171 and 172 is executed without any delay, and therefore the delay amount required in the differentiator 173 is zero.

The differential signal S11' outputted from the delay circuit 173 is supplied to the comparator 174 and then is compared with the threshold value +V, whereby a signal S13 of FIG. 4E turned to its high level in the periphery of the leading edge of the reproduced signal $S_{MO}$ is outputted from the comparator 174. Similarly, the differential signal S11' outputted from the delay circuit 173 is supplied also to the comparator 175 and then is compared with the threshold value −V, whereby a signal S14 of FIG. 4F turned to its high level in the periphery of the trailing edge of the reproduced signal $S_{MO}$ is outputted from the comparator 175. As will be described later, the signals S13 and S14 are used as gate signals, since these signals are turned to a high level thereof in the periphery of the edge of the reproduced signal $S_{MO}$ as mentioned above.

The secondary differential signal S12 outputted from the differentiator 172 is supplied to the comparator 176 and then is compared with the zero level, whereby a signal S15 of FIG. 4G is outputted from the comparator 176. This output signal S15 falls in synchronism with the leading edge of the reproduced signal $S_{MO}$ and rises in synchronism with the trailing edge of the reproduced signal $S_{MO}$. Each of portions denoted by "X" in FIG. 4G is an indefinite area where the threshold value (zero level) of the comparator 176 and the level of the secondary differential signal S12 are approximately equal to each other.

The output signal S15 of the comparator 176 is inverted and supplied to the AND circuit 177, to which the output signal S13 of the comparator 174 is also supplied as a gate signal. Therefore a pulse signal S16 of FIG. 4H rising in synchronism with the leading edge of the reproduced signal $S_{MO}$ is obtained from the AND circuit 177. Similarly, the output signal S15 of the comparator 176 is supplied to the AND circuit 178, to which the output signal S14 of the comparator 175 is also supplied as a gate signal. Therefore a pulse signal S17 of FIG. 4I rising in synchronism with the trailing edge of the reproduced signal $S_{MO}$ is obtained from the AND circuit 178.

Subsequently, these signals S16 and S17 are supplied to the OR circuit 179, which then outputs a pulse detection signal $P_{DS}$ of FIG. 4J rising in synchronism with the leading and trailing edges of the reproduced signal $S_{MO}$. In this stage, as the magneto-optical disk 111 is scanned by the light beam emitted from the optical head 117, magnetic wall displacements are generated at the temporal interval corresponding to the spatial interval of the recorded magnetic walls 15. The reproduced signal $S_{MO}$ rises in response to generation of a displacement of the magnetic wall 15 where the atomic spin direction 14 (see FIG. 9A) is changed from one to the other, or the reproduced signal $S_{MO}$ falls in response to generation of a displacement of the magnetic wall 15 where, contrary to the above, the atomic spin direction 14 is changed from the other to one. Consequently, the aforementioned detection signal $P_{DS}$ represents the result of detecting the magnetic wall displacement from the reproduced signal $S_{MO}$.

As obvious from the waveform of each signal, if any sudden DC level variation peculiar to the DWDD type is caused in the portion indicated by an arrow P in FIG. 4A, such variation brings about substantially no harmful influence on the output signals S11, S12 of the differentiators 171, 172. Consequently, despite any sudden DC level variation caused in the reproduced signal $S_{MO}$, the detection signal $P_{DS}$ properly represents the result of detecting the edge of the reproduced signal $S_{MO}$, i.e., generation of the magnetic wall displacement.

Figure 5:
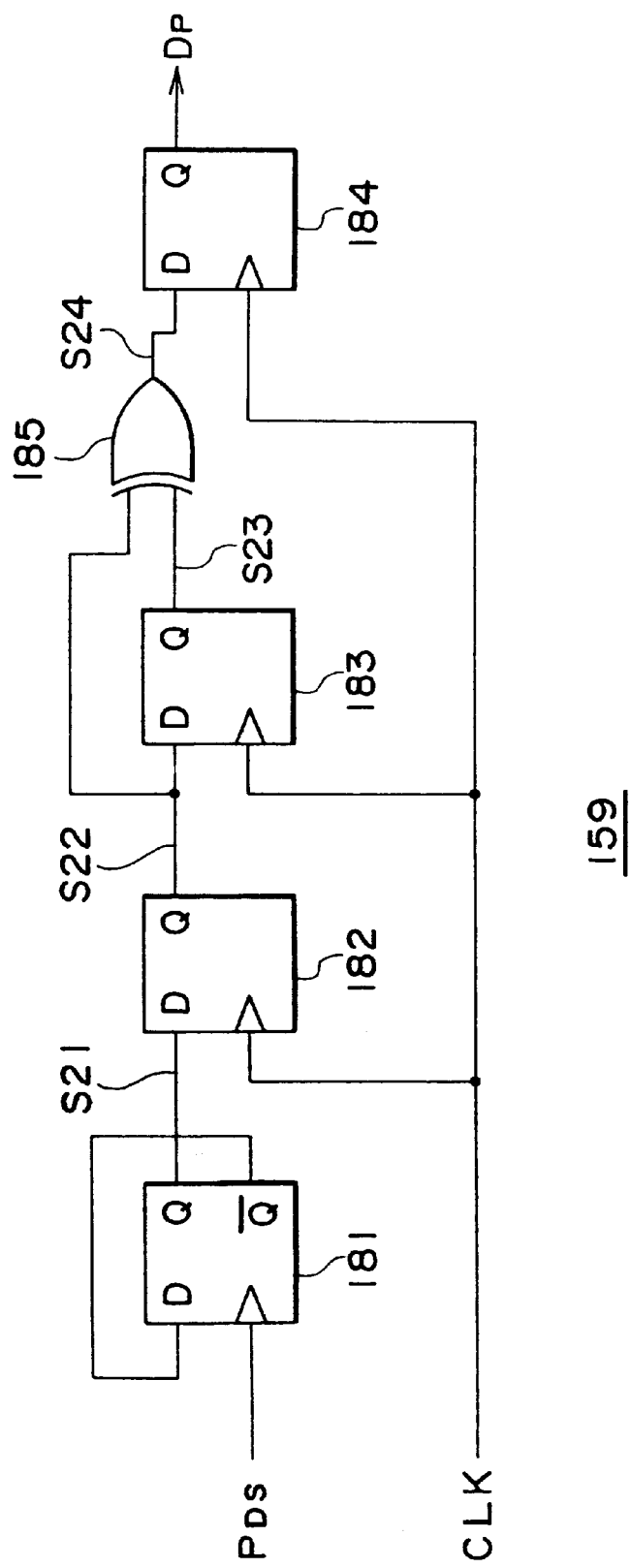
FIG. 5 is a block diagram showing a structural example of a data detection circuit.

Next, the structure of the data detection circuit 159 will be described below. FIG. 5 shows a structural example of the data detection circuit 159. This data detection circuit 159 comprises four D flip-flops 181–184 and an exclusive OR circuit 185. The detection signal $P_{DS}$ outputted from the magnetic wall displacement detection circuit 157 is supplied to a clock terminal of the flip-flop 181, and an inverted output terminal Q bar of the flip-flop 181 is connected to a data terminal D. Thus, the flip-flop 181 constitutes a T flip-flop.

An output terminal Q of the flip-flop 181 is connected to a data terminal D of the flip-flop 182, while an output terminal Q of the flip-flop 182 is connected to a data terminal D of the flip-flop 183. And output terminals Q of the flip-flops 182 and 183 are connected respectively to the input side of the exclusive OR circuit 185. An output terminal Q of the flip-flop 184 serves as a reproduced-data output terminal. And a clock signal CLK produced in the PLL circuit 158 is supplied to the respective clock terminals of the flip-flops 182–184.

Figure 6:
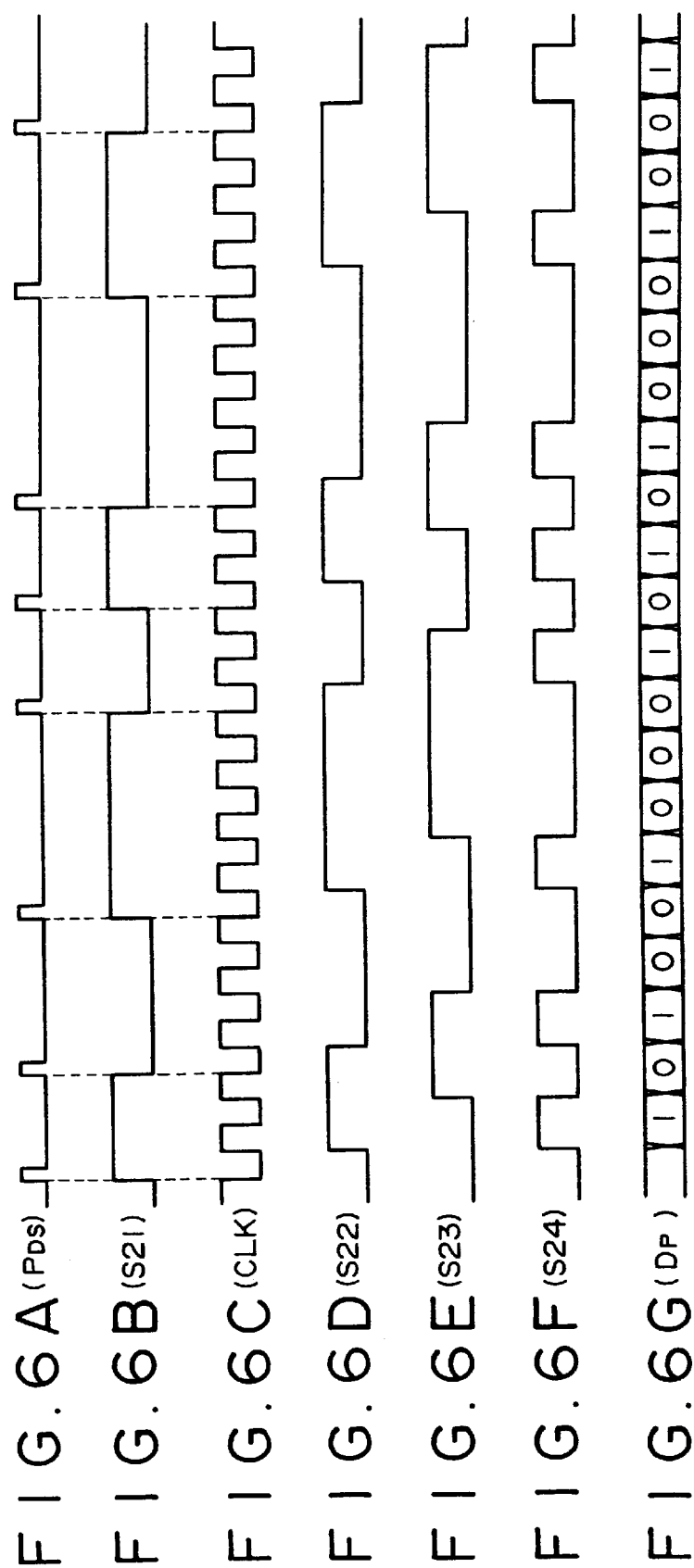
FIGS. 6A to 6G are timing chart of signals for explaining the operation of the data detection circuit.

Hereinafter the operation of the data detection circuit 159 shown in FIG. 5 will be described with reference to timing charts of FIGS. 6A to 6G. FIG. 6A shows an example of the detection signal PDS outputted from the magnetic wall displacement detection circuit 157, and FIG. 6C shows a clock signal CLK outputted from the PLL circuit 158 and synchronized with the leading edge of the detection signal $P_{DS}$.

When the detection signal $P_{DS}$ is supplied to the clock terminal of the flip-flop 181, there is obtained, from its output terminal Q, a signal S21 whose state is inverted at every leading edge of the detection signal $P_{DS}$, as shown in FIG. 6B. Then the signal S21 is supplied to the data terminal D of the flip-flop 182, and a signal S22 synchronized by the clock signal CLK as shown in FIG. 6D is obtained from the output terminal Q of the flip-flop 182. The signal S22 thus obtained is supplied to the data terminal D of the flip-flop 183, and a signal S23 delayed correspondingly to the duration of one clock pulse as shown in FIG. 6E is obtained from the output terminal Q of the flip-flop 183.

The signals S22 and S23 obtained respectively from the output terminals Q of the flip-flops 182 and 183 are supplied to the exclusive OR circuit 185, which then takes an exclusive logical sum of the input signals. Consequently, there is obtained, from the OR circuit 185, a signal S24 which becomes 1 at the edge position while being kept in synchronism with the clock signal CLK as shown in FIG. 6F and becomes 0 at any other position than the edge, whereby the NRZI waveform is converted into an NRZ waveform. The signal S24 thus obtained is then supplied to the data terminal D of the flip-flop 184, and reproduced data (NRZ data) $D_P$ synchronized by the clock signal CLK as shown in FIG. 6G is obtained from the output terminal Q of the flip-flop 184.

Next, the operation of the magneto-optical disk apparatus shown in FIG. 1 will be described below. In case a data write command is supplied from the host computer to the system controller 151, a data write (recording) mode is executed. In this case, an error correction code is attached, in the ECC circuit 154, to the write data received from the host computer via the SCSI 153 and stored in the data buffer 152, and then the data are converted into RLL modulated bits or NRZI data in the data modulator 155. Subsequently, record data $D_r$ in the form of NRZI data are supplied from the data modulator 155 to the magnetic head driver 116, and the data $D_r$ are recorded in the data area at a target position on the magneto-optical disk 11.

In case a data read command is supplied from the host computer to the system controller 151, a data read (reproducing) mode is executed. In this case, a reproduced signal $S_{MO}$ is obtained from the data area at a target position on the magneto-optical disk 111. The reproduced signal $S_{MO}$ is processed in the equalizer circuit 156 for compensation of its frequency characteristic, and then a reproduced signal $S_{MO'}$ after such compensation is supplied to the magnetic wall displacement detection circuit 157. Subsequently, a detection signal $P_{DS}$ obtained from the detection circuit 157 to represent generation of a magnetic wall displacement is supplied to the PLL circuit 158 and the data detection circuit 159.

In the PLL circuit 158, a clock signal CLK synchronized with the leading edge of the detection signal $P_{DS}$ is reproduced. Meanwhile in the data detection circuit 159, reproduced data (NRZ data) $D_P$ are obtained from the detection signal $P_{DS}$ by the use of the clock signal CLK reproduced in the PLL circuit 158. The reproduced data $D_P$ are demodulated in the data demodulator 160 and then are corrected in the ECC circuit 154, whereby read data are obtained. Subsequently the read data are once stored in the data buffer 152, and thereafter are transmitted at predetermined timing to the host computer via the SCSI 153.

In this embodiment, as described above, generation of the magnetic wall displacement is detected from the reproduced signal $S_{MO}$ by the magnetic wall displacement detection circuit 157, and detection of the data is performed in the data detection circuit 159 by the use of the detection signal $P_{DS}$ to obtain reproduced data $D_P$. In this case, generation of the magnetic wall displacement is detected in the magnetic wall displacement detection circuit 157 by using the differential signal of the reproduced signal $S_{MO}$ or the difference signal thereof in the time base direction. Consequently, even if any sudden DC level variation peculiar to the DWDD type is caused in the reproduced signal $S_{MO}$, it brings about substantially none of harmful influence on the process of detection, so that the detection signal $P_{DS}$ properly represents the result of detecting the generation of the magnetic wall displacement, hence realizing desired reproduction of the data at a sufficiently low bit error rate.

It is to be understood that the present invention is not limited merely to the above embodiment alone. For example, the equalization target waveform of the equalizer circuit 156 may be set to a differential one, and the equalizer circuit 156 may be used also as the differentiator 171 (see FIG. 2) of the magnetic wall displacement detection circuit 157.

Figure 7:
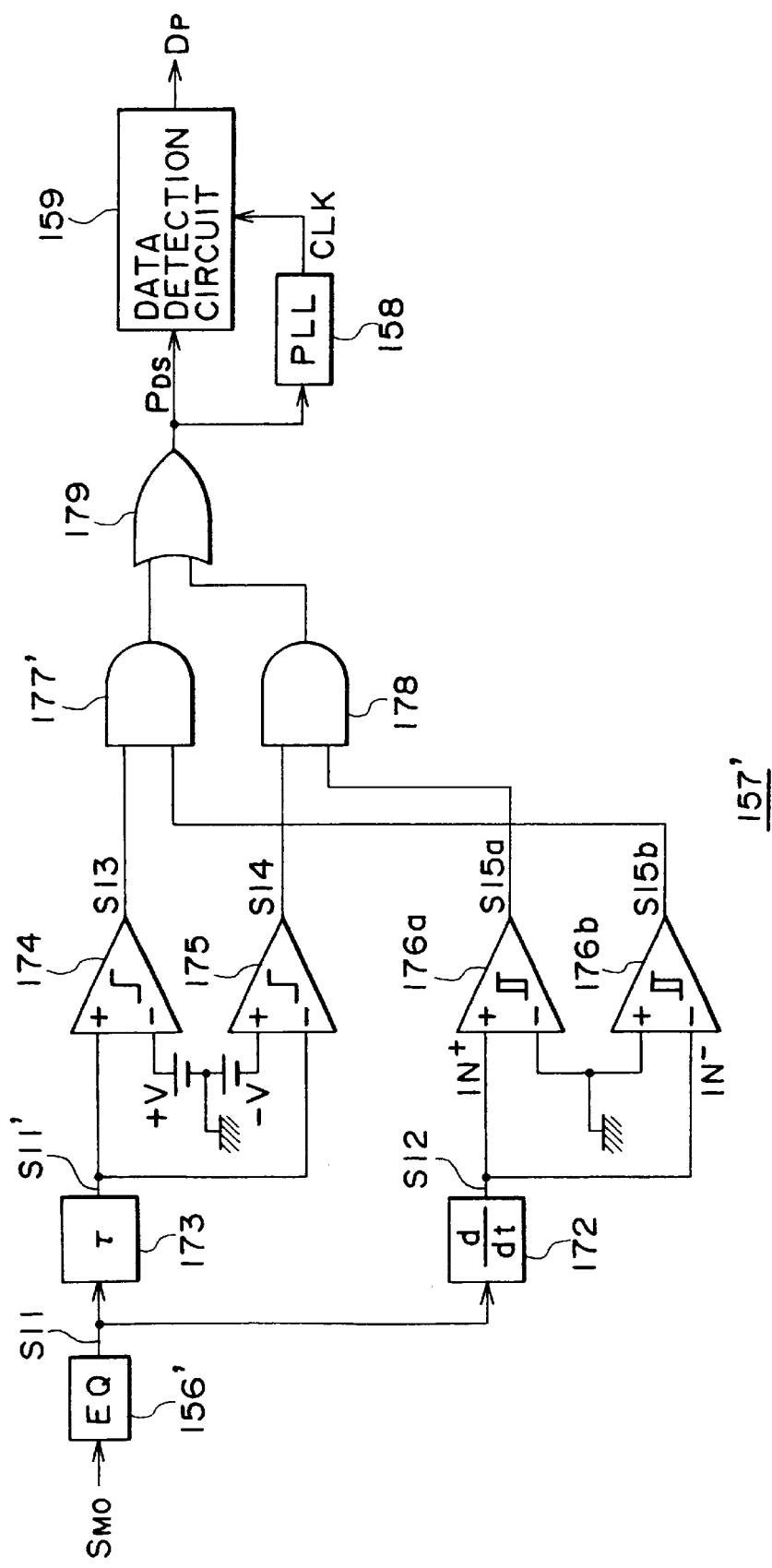
FIG. 7 is a block diagram showing another structural example of the magnetic wall displacement detection circuit.

In order to avoid unnecessary power consumption or generation of noise in any region where the output signal from the comparator 176 of the magnetic wall displacement detection circuit 157 is rendered unstable, the comparator 176 may be replaced with two comparators each having hysteresis. FIG. 7 shows a magnetic wall displacement detection circuit 157' where such a modified structure is employed. In FIG. 7, any component parts corresponding to those in FIG. 2 are denoted by like reference numerals or symbols, and a detailed explanation thereof is omitted here.

Figure 8:
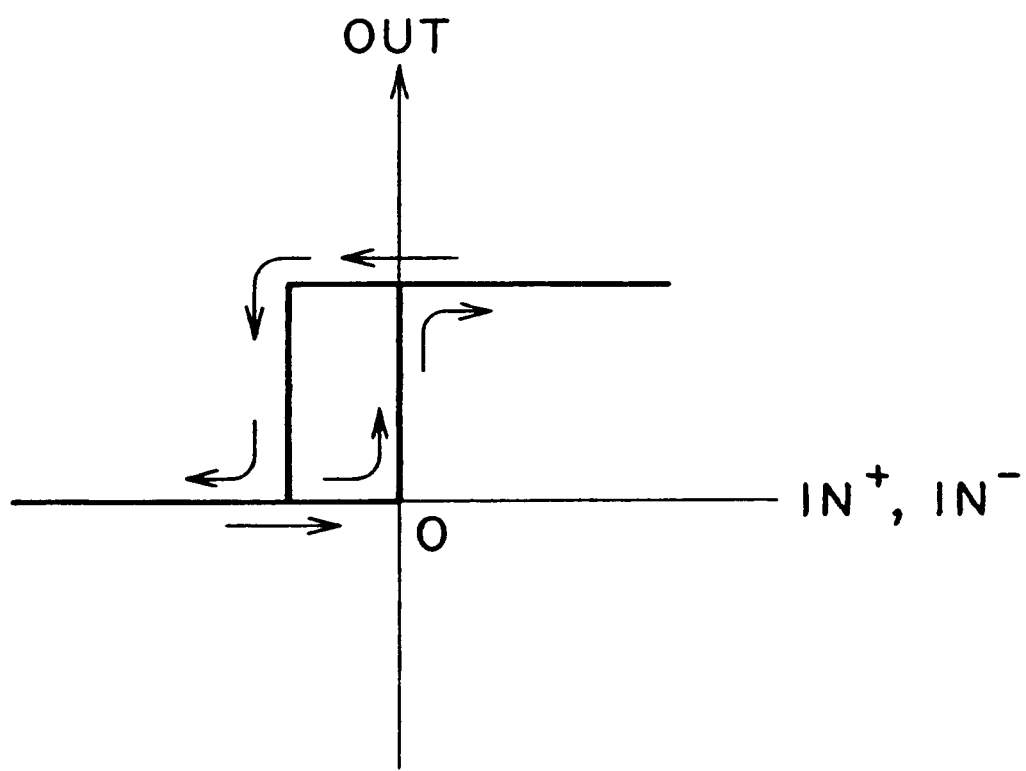
FIG. 8 graphically shows input-output characteristics of a comparator having hysteresis.

In an equalizer circuit 156', its equalization target is set to a differential waveform, thereby eliminating the necessity of the differentiator 171 shown in FIG. 2. Each of comparators 176a and 176b has hysteresis. A secondary differential signal S12 outputted from a differentiator 172 is supplied to a non-inverting input terminal of the comparator 176a and then is compared with a zero level supplied to the non-inverting input terminal. When the input to the comparator 176a is IN⁺, the input-output characteristics thereof are such as shown in FIG. 8. An output signal S15a obtained from the comparator 176a is supplied to an AND circuit 178.

Each of the comparators 176a and 176b has hysteresis. A secondary differential signal S12 from the differentiator 172 is supplied to a non-inverting input terminal of the comparator 176b and then is compared with a zero level supplied to the non-inverting input terminal. When the input to the comparator 176b is IN⁻, the input-output characteristics thereof are such as shown in FIG. 8. An output signal S15b from the comparator 176b is supplied to an AND circuit 177'. This AND circuit 177' is a normal one differently from the AND circuit 177 in FIG. 2 where one input is a negative logic, because the signal S15b obtained from the comparator 176b need not be inverted.

The magneto-optical disk apparatus 100 shown in FIG. 1 is equipped with the SCSI 153 for transferring data from or to the host computer. However, the present invention is applicable also to an apparatus equipped with, for example, an MPEG encoder/decoder instead to perform recording and reproduction of video and audio signal data.

Thus, according to the present invention, generation of a magnetic wall displacement is detected from a differential signal or a difference signal of the reproduced signal, and the data are detected on the basis of the result of detecting the displacement. Therefore, even if any sudden DC level variation peculiar to the DWDD type is induced in the reproduced signal, such DC level variation causes substantially none of harmful influence on the process of detecting generation of the magnetic wall displacement, hence achieving exact detection of the magnetic wall displacement with high precision. Consequently, it becomes possible to reproduce the data at a sufficiently low bit error rate while ensuring a superior operation with a systematic margin. Further, occurrence of some sudden DC level variations can be permitted to a certain extent with regard to the DWDD type magneto-optical recording medium used in the apparatus, thereby attaining contribution to improvement of the medium yield rate and also to reduction of the manufacturing cost.

What is claimed is:

1. A data reproducing apparatus handling a magneto-optical recording medium which consists at least of a displacement layer, a switching layer and a memory layer formed in this order, said memory layer being composed of a perpendicular magnetizing film, said displacement layer being composed of another perpendicular magnetizing film whose magnetic wall reluctance is relatively smaller than that of said memory layer and whose magnetic wall displaceability is relatively greater than that of said memory layer, said switching layer being composed of a magnetic layer whose Curie temperature is lower than those of said displacement layer and said memory layer; said data reproducing apparatus comprising:

a signal reproducing means for irradiating a light beam from the side of said displacement layer onto said magneto-optical recording medium while moving the light beam relatively to said medium, and displacing a magnetic wall which has a gradient on the magnetic recording medium in the direction of motion of the light beam spot and is formed in said displacement layer with a temperature distribution having a temperature region higher than the Curie temperature of at least said switching layer, thereby obtaining a reproduced signal which corresponds to the change on a polarization plane of the reflected light of said light beam;

a magnetic wall displacement detection means for detecting generation of the magnetic wall displacement by the use of a differential signal of the reproduced signal obtained from said signal reproducing means, or by the use of a difference signal thereof in the time base direction; and a data detection means for detecting data by the use of the detection signal obtained from said magnetic wall displacement detection means.

2. A data reproducing apparatus according to claim 1, wherein said magnetic wall displacement detection means obtains, as said detection signal, a pulse signal at the time of generation of the magnetic wall displacement by the use of a differential signal of the reproduced signal or a difference signal thereof in the time base direction, and also by the use of differential signals of such signals or difference signals thereof in the time base direction.

3. A data reproducing method handling a magneto-optical recording medium which consists at least of a displacement layer, a switching layer and a memory layer formed in this order, said memory layer being composed of a perpendicular magnetizing film, said displacement layer being composed of another perpendicular magnetizing film whose magnetic wall reluctance is relatively smaller than that of said memory layer and whose magnetic wall displaceability is relatively greater than that of said memory layer, said switching layer being composed of a magnetic layer whose Curie temperature is lower than those of said displacement layer and said memory layer; said data reproducing method comprising:

a first step of irradiating a light beam from the side of said displacement layer onto said magneto-optical recording medium while moving the light beam relatively to said medium, and displacing a magnetic wall which has a gradient on the magnetic recording medium in the direction of motion of the light beam spot and is formed in said displacement layer with;a temperature distribution having a temperature region higher than the Curie temperature of at least said switching layer, thereby obtaining a reproduced signal which corresponds to the change on a polarization plane of the reflected light of said light beam;

a second step of detecting generation of the magnetic wall displacement by the use of a differential signal of the reproduced signal obtained at said first step, or by the use of a difference signal thereof in the time base direction; and a third step of detecting data by the use of a detection signal which represents generation of the magnetic wall displacement detected at said second step.

4. A data reproducing method according to claim 3, wherein, at said second step, a pulse signal is obtained, as said detection signal, at the time of generation of the magnetic wall displacement by the use of a differential signal of the reproduced signal or a difference signal thereof in the time base direction, and also by the use of differential signals of such signals or difference signals thereof in the time base direction.

* * * * *